United States Patent [19]

Hunt et al.

[11] 4,246,310
[45] Jan. 20, 1981

[54] HIGH PERFORMANCE, LIGHTWEIGHT STRUCTURAL PARTICLEBOARD

[75] Inventors: Michael O. Hunt, West Lafayette, Ind.; William F. Lehmann, Tacoma, Wash.; David A. Fergus, West Lafayette, Ind.

[73] Assignee: The United States of America as represented by the Secretary of Agriculture, Washington, D.C.

[21] Appl. No.: 27,695

[22] Filed: Apr. 6, 1979

Related U.S. Application Data

[63] Continuation-in-part of Ser. No. 934,290, Aug. 17, 1978, abandoned.

[51] Int. Cl.³ .................. B32B 21/02; B32B 21/08; B32B 21/14
[52] U.S. Cl. .................. 428/106; 428/107; 428/113; 428/114; 428/218; 428/337; 428/339; 428/528; 428/541
[58] Field of Search ............ 428/105, 106, 107, 110, 428/114, 218, 337, 339, 540, 113, 541, 393, 528; 198/383

[56] References Cited

U.S. PATENT DOCUMENTS

| | | | |
|---|---|---|---|
| 3,093,524 | 6/1963 | Flamant et al. ............. | 428/114 X |
| 3,164,511 | 1/1965 | Elmendorf ................. | 428/337 X |
| 3,447,996 | 6/1969 | Himmelheber .............. | 428/113 |
| 3,478,861 | 11/1969 | Elmendorf ................. | 198/383 |
| 3,616,128 | 10/1971 | Pacourek ................... | 428/113 X |
| 3,721,329 | 3/1973 | Turner et al. .............. | 198/383 X |
| 3,956,555 | 5/1976 | Mc Kean ................... | 428/106 |
| 4,061,819 | 12/1977 | Barnes ..................... | 428/294 |
| 4,112,162 | 9/1978 | Casselbrant ................ | 428/106 |
| 4,122,236 | 10/1978 | Holman .................... | 428/453 |
| 4,131,705 | 12/1978 | Kubinsky ................... | 428/106 |
| 4,175,150 | 11/1979 | Luck et al. ................. | 428/218 X |
| 4,195,110 | 3/1980 | Dierks et al. ............... | 428/218 |
| 4,204,421 | 5/1980 | Rogers et al. ............... | 428/106 X |

FOREIGN PATENT DOCUMENTS

584444 10/1959 Canada .
597587 5/1960 Canada .................. 428/106

OTHER PUBLICATIONS

Maloney, "Modern Particleboard + Dry Process Fiberboard Manufacturing", Miller Freeman Publications 1977, pp. 27, 161, 162.
Kelley, "Critical Literature Review etc.," Forest Products Lab., USDA, 1977, Forest Service.
Fergus et al., "Potential Use of Wood-Base Materials etc.", Purdue University, 1977.
Gelmer, "Flake Achievement in Particleboard etc.", Forest Products Lab, USDA, 1976, Forest Service.

*Primary Examiner*—Harold Ansher
*Attorney, Agent, or Firm*—M. Howard Silverstein; David G. McConnell

[57] ABSTRACT

Alined wood particles and an adhesive binder comprise the faces of a sandwiched, laminate-like structure formed in a one-step pressing and heating operation, the interior of which is made of randomly oriented wood particles and an adhesive binder, exhibiting lighter weight and greater bending strength than known particle-boards constructed from heavy hardwoods such as red oak.

5 Claims, 3 Drawing Figures

HIGH PERFORMANCE, LIGHTWEIGHT STRUCTURAL PARTICLEBOARD

This is a continuation-in-part of application Ser. No. 934,290, filed Aug. 17, 1978, now abandoned.

BACKGROUND OF THE INVENTION

1. Field of the Invention

The invention relates to the particleboard art generally with particular reference to a product that is comprised of a core layer of wood particle-adhesive aggregate hot pressed between two thin face layers of similar composition to form a lightweight laminate-like structural component.

2. Description of the Prior Art

In conventional industrial and commercial building construction in the eastern United States, the roof structure of a typical building consists of 18 to 22 gauge wide-ribbed steel deck fastened to supporting steel beams which are spaced 4 to 6 feet on center. Applied to the top surface of the ribbed steel deck are boards of rigid insulation which form the base for a standard built-up roof. Until now, no particleboard of sufficient bending stiffness and low cost has been manufactured that could compete with ribbed steel decking in this market.

At a time when there is increasing concern over the disappearance of nonrenewable resources such as iron ore and fossil fuels, and when the volume of hardwoods is increasing, the use of a hardwood structural particleboard instead of wide-ribbed steel decking as a roofing panel is highly desirable. A product of this type must meet the structural requirements of the construction industry. It would utilize small and inferior trees that are indigenous to the Eastern United States, the targeted marketing area, and have limited use in other products. The invention should require less energy for manufacture and have better insulating properties than steel decking. Transportation costs would be cut because of the wood's proximity to the targeted marketing areas.

A similar invention is U.S. Pat. No. 3,164,511, issued Jan. 5, 1965, Oriented Strand Board, hereinafter referred to as Elmendorf. Elmendorf claimed a structural particleboard comprised of three or more laminae, the face laminae being comprised of "parallel oriented" or alined flakes, and the core lamina being comprised of "randomly distributed" flakes. However, Elmendorf's invention anticipated only particleboard with densities greater than those of the wood species of which they are comprised and particleboard component woods with specific gravities of less than 0.6. Elmendorf, column 3, lines 23–27.

Maloney stated that "[t]he most important species variable governing board properties is the density of the wood raw material itself . . . " In general terms, the lower density woods will produce panels within the present desired specific gravity ranges, usually with strength properties superior to the higher density species. In the United States and Canada, this specific gravity range of presently used species is from about 0.30 to 0.50. Some of the higher density species such as oak and hickory, which are about 0.65 specific gravity, are used in higher density products, usually of the hardboard classification. Maloney, T. M. *Modern Particleboard and Dry Process Fiberboard Manufacturing.* San Francisco, Miller Freeman Publications, 1977. p. 161. TS875.M29.

Kelly, referring to the effect of compaction ratio on physical properties, asserts: "In general, a conventional particleboard with a density lower than the density of a wood furnish will be unsatisfactory." Kelly, M. W., *Critical Literature Review of Relationships Between Processing Parameters and Physical Properties of Particleboard.* Madison, Wis., Forest Products Laboratory, USDA, Forest Service, 1977. p. 3. 1.9.F761G.FPL 10. High density hardwoods have not been used as a major constituent in the production of medium density particleboard.

Canadian Pat. No. 584,444, issued Oct. 6, 1959, Particle Board, hereinafter referred to as Yan, described a method of assuring uniform density in the layers of a particleboard. It did not, however, show that a medium density board having sufficient bending stiffness to permit use in structural applications could be manufactured.

U.S. Pat. No. 3,478,861, issued Nov. 18, 1969, Orienting Wood Strands, hereinafter referred to as Elmendorf II, described a method of alining flakes in the face layers of particleboard such that the lengths of the flakes are parallel with the length of the board. However, the Elmendorf II process will not produce medium-density boards from dense hardwoods with bending stiffness approaching that of our particleboards.

A prospectus published by the Department of Forestry and Natural Resources of Purdue University and authored by two of the three inventors and others in April 1977, did not disclose the invention, but merely indicated that a market existed for such an invention and suggested that a particleboard constructed in a certain manner could conceivably meet the construction industry requirements.

The inventors are unaware of any other structural particleboard with the physical properties required for the intended long-span roof decking application that is cost-competitive with wide-ribbed steel decking; nor are they aware of any high-strength structural particleboard manufactured at a particleboard density less than or equal to the density of the wood species.

SUMMARY OF THE INVENTION

The invention disclosed is a building component of cellulosic particles and adhesive binder comprising a sandwiched, laminate-like structure formed in a one-step pressing and heating operation. The particleboard panel may be formed in standard press equipment.

An object of this invention is a flat-pressed panel that can be used as a replacement for ribbed steel in commercial and industrial roof decking applications. A further object of this invention is the provision of a panel which is simply and economically formed from residue cellulosic material such as red oak to thereby aid in conserving and more effectively using our timber resources.

A further object of the invention is a flat-pressed panel that requires less energy for manufacture and less insulation to achieve a lower thermal transmission level (U factor) than ribbed steel, thereby conserving our energy resources.

Another object of this invention is a flat-pressed panel that is less dense than the dense wood of which it is comprised.

In accordance with these objects, we have discovered a structural board comprising at least three laminae bonded together, each lamina consisting of wood flakes bonded together. The fibers of the flakes extend generally parallel to the surface of the board and to the length of the flakes, with the outer laminae flakes crossing at least one other flake in the same lamina at an acute angle. The average direction of the bisectors of these acute angles is substantially parallel to the length of the board. The average flake length is 1½ to 5 inches, and the resin is 4 to 10 percent the ovendry weight of the flakes. The panel is constructed of a hardwood with a specific gravity of 0.6 or greater, and the flakes used range in thickness from 0.008 to 0.055 inches. The board has a bending stiffness greater than 800,000 psi, an edgewise shear greater than 1,800 psi, and is lighter than the specific gravity of the constituent wood species, with flake alinement averaging 40 percent.

As wood is an insulating material as opposed to steel which is a conductor, and as wood requires less energy for processing than does steel, the use of the invention in roofing application will result in the conservation of energy.

DESCRIPTION OF THE PREFERRED EMBODIMENTS

Figure 1:
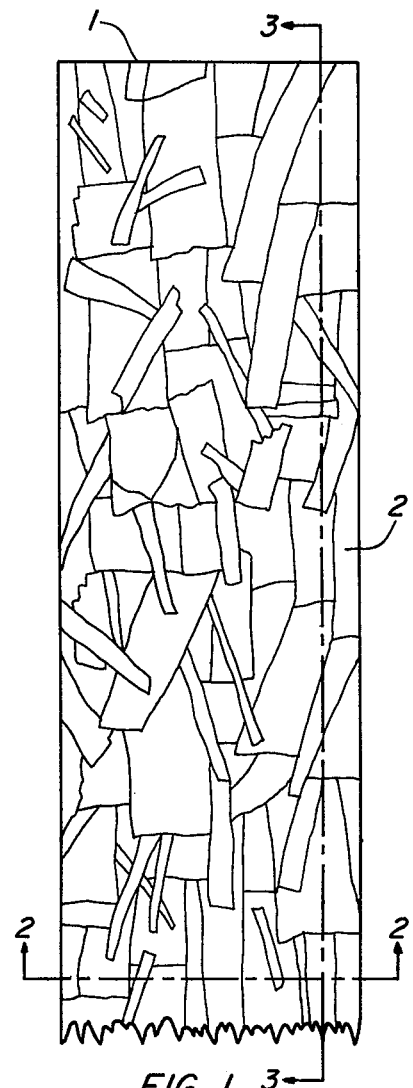
FIG. 1 is a plan view of the structural board formed in accordance with the present invention, illustrating the oriented nature of the face layers.

Our invention is a high-strength, medium-density particleboard with a density less than that of the wood species from which it is made. The average specific gravity of the red oak used in the manufacture of the invention was 0.62, at ovendry weight and green volume. This converts (*Wood Handbook*, revised edition, Washington, D.C., Government Printing Office, 1974. p. 3–8. 1.Ag84Ah.no. 72, 1974) to a density, weight and volume at 80° F. and 50 percent relative humidity, of 47.6 pounds per cubic foot. Particleboards made in the experimental work of this invention had densities of 48.8, 46.2, and 42.5 pounds per cubic foot, weight and volume at 80° F., and 50 percent RH. Calculating the compaction ratios, or the density of particleboards, values obtained are 1.025, 0.977, and 0.895, respectively. From a material science standpoint, these values assume great significance. It has long been accepted that to manufacture quality particleboard, the board's density must be considerably greater than the density of the wood from which it is made, i.e., compaction ratios must be greater than unity. Hse, among others, has shown that particleboards with a compaction ratio of less than unity can be manufactured. A comparison of the physical properties such as bending modulus, E, of those particleboards, and that of the product of the instant invention in Table 1 shows that previous particleboards with compaction ratios less than unity were not satisfactory for the intended structural application.

The data in Table 1 indicates that the invention has unexpected properties. The light weight of the invention, 42.5–48.8 lb/ft$^3$ is significant, as its intended application is in the construction industry. Roof decking is generally put in place by two construction workers, and a heavier panel would lead to increased worker fatigue. In addition, since the weight of the decking contributes to the total load that must be carried by the support system, heavier decking results in a costlier design for the supporting beams.

The invention also has an unexpectedly high bending modulus of elasticity for its compaction ratio. A roofing base material must resist bending resulting from static loads. To be highly competitive as commercial and industrial roof decking, design loads must be supported by panels that are continuous over two or more supports 4 to 6 feet apart. This criterion is established by the savings realized in decreasing the number of secondary supports or purlins necessary to support the roof deck. The most economical structural systems have purlins spaced about 6 feet apart.

The inventors consulted architects and structural engineers to determine reasonable loads for the calculation of necessary board stiffness. Fifteen (15) pounds per square foot was suggested as a reasonable estimate of the weight of a typical built-up roof system including insulation and structural decking. Thirty (30) pounds per square foot was suggested as a reasonable uniform design live load to account for such loads as snow. The total design load was thus forty-five (45) pounds per square foot and the required panel stiffness, EI, using the 6 foot span discussed above and 1/180 times the span for allowable deflection (*Uniform Building Code*, 1976 Ed., Whittier, Cal., International Conference of Building Officials, 1976. p. 126–151, KF-5701.1 524), is $1.135 \times 10^5$ pound inch$^2$/inch. For a 1⅛" panel thickness, the particleboard material must have a modulus of elasticity of at least 1,180,000 psi to achieve the required bending stiffness of $1.135 \times 10^5$ pound inch$^2$/inch. The 1⅛" thick panels of 48.8 and 46.2 pounds per cubic foot density and the 1⅛" thick 42.5 pound per cubic foot panel of red oak particleboard made in the experimental work resulting in this invention has panel stiffness, EI, of $1.661 \times 10^5$, $1.542 \times 10^5$ and $1.521 \times 10^5$ pounds inch$^2$/inch, respectively. The corresponding moduli of elasticity were 1,402,000, 1,304,000, and 1,062,000 pounds per square inch.

Figure 2:
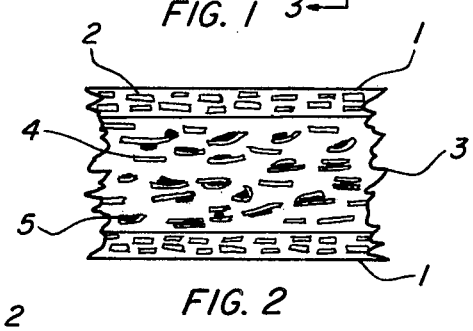
FIG. 2 is a section, on an enlarged scale, along plane 2—2 of FIG. 1.
Figure 3:
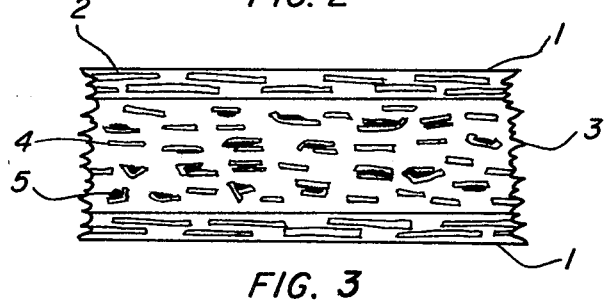
FIG. 3 is a section, on an enlarged scale, along plane 3—3 of FIG. 1.

The invention's inner core layer is comprised of randomly or cross-alined relatively coarse, thick flakes of random width and a minor amount of thermosetting adhesive. Referring now to the drawings, FIGS. 2 and 3 show sections, on an enlarged scale, along planes 2—2 and 3—3 of FIG. 1, respectively. The core layer 3 comprises about 65 percent of the total panel weight.

The two face layers enclose and are denser than the core layer 3. They contain well-machined relatively thin flakes of random width and large length to thickness ratio with grain direction parallel to the length of the flake. The axes are alined parallel, plus or minus twenty degrees, to the long side of the panel. FIG. 1 shows a plan view of the structural board formed in accordance with the invention. The exposed face of the panel or lamina appears at 1 in FIG. 1. The oriented nature of the flakes 2 with respect to the length of the board can be observed. The grain of the flakes 2 is parallel with the length of the board.

Referring again to the drawings, each face layer 1 comprises about 17.5 percent of the total panel weight and is bonded with a minor amount of thermosetting adhesive. The overall density of the panel is less than or equal to the density of the wood used in its manufacture.

It is believed by the inventors that the unusually low density and high strength of the panel is achieved because of the properties of the panel's components. The low density is achieved because of the thickness of the core layer's flakes. It is well known and can be mathematically proven that for a given volume filled with spheres of a constant diameter, as the diameter of spheres in that volume increases, so does the void space as a percentage of that volume, where void space is defined as the volume not occupied by the spheres. Similarly, as the thickness of these randomly oriented flakes 4 in the core increases, the void space in the core as a percentage of total core volume increases. The void space is largely filled with air and thus adds negligible weight to the panel, resulting in a lighter, less dense core. An examination of FIG. 2 or 3 will reveal the existence of some void spaces 5 in the core layer.

The high strength of the core layer 3 can also be attributed to the thickness of the flakes 4. Because a layer diameter sphere or large thickness particle has less surface area for a given volume of spheres or particles than small diameter spheres or small thickness particles, the use of large thickness flakes increases the effectiveness of the adhesive used to bond the core. As the adhesive used is generally an expensive component in the particleboard, its use should be sparing. Because large-thickness flakes have less surface area for a given volume of flakes than small-thickness flakes, a given amount of adhesive is likely to be applied to a greater percentage of the total number of flakes and/or a greater percentage of the area of each flake when thicker flakes are used. Therefore, a better bond can be expected and the adhesive's effectiveness is increased.

In addition, it was found in experiments done on boards with core flakes of various thicknesses that the boards with the best interlaminar shear integrity were those with the thickest core flakes, up to a limit of 0.050 inch. Shear characteristics are important in structural applications where a panel acts as a diaphragm in a building system subjected to wind or seismic loading.

The bending modulus of elasticity, E, of the face layers 1 is attributable to the alined orientation of the component particles 2. The flakes 2 in the face layer are of random width, but in general will have a length-to-width ratio greater than unity. One would thus expect that a section along plane 3—3 in FIG. 1 would show that the dimension of an individual flake in that plane would be greater than the dimension of that same flake along plane 2—2. This is depicted by the representation of flakes in the face layers of FIGS. 2 and 3.

The data in Table 1 shows the high valued properties of the product of the invention. It should be noted at the outset that as different relative humidities and temperatures are referred to in the literature from which the table's information is obtained in calculating the specific gravities of the specimens, the specific gravities should not be examined scrupulously in making comparisons. The compaction ratio is the significant variable and that is always calculated at constant relative humidities and temperatures.

Homogeneous boards are boards whose composition is similar throughout the thickness of the particleboard. Layered boards have dissimilar composition in adjacent layers or strata. For example, in a three-layered board, the two exterior layers may have thin flakes alined parallel with the length of the board while the interior layer has a random flake orientation.

A comparison of compaction ratios for the nonalined and alined particleboard in Table 1 with the corresponding moduli of elasticity, E's, demonstrates that the only board other than the products of our invention even approaching the target value, E, of 1,180,000 psi determined necessary for 1⅛" roof panels is one of the two Douglas-fir boards. However, the compaction ratio of these Douglas-fir boards is 1.35. Boards with compaction ratios near unity had moduli of elasticity between 222,000 and 707,000 psi. The particleboards made prior to the present invention and listed in the table support Kelly's statements regarding physical properties of particleboards. Before our invention, he stated: "[A] compaction ratio of 1.25 [is] required to obtain bending strength necessary for external particleboard applications" and "a conventional particleboard with a density lower than the density of the wood furnish will be unsatisfactory." Kelly, M. W., *Critical Literature Review Between Processing Parameters and Physical Properties of Particleboard.* Madison, Wis., Forest Products Laboratory, USDA Forest Service, 1977, p. 30, 3. 1.9F761G.FPL 10. The products of our invention have effectively refuted these statements, combining a low compaction ratio (0.89 to 1.02) with a high modulus of elasticity (1,062,000 to 1,402,000 psi) for the first time.

In constructing a particleboard, alining the flakes will increase bending modulus, E, but decrease edgewise shear strength. Random or nonalined flake orientation will increase a board's edgewise shear strength at the expense of bending modulus. This tradeoff for alined boards is demonstrated by the data for Douglas-fir in Table 1.

With alined face flakes and crossalined core flakes, the first-listed Douglas-fir particleboard has a parallel bending modulus, E, of 1,398,000 psi and an edgewise shear of 1,280 psi. The second Douglas-fir board has random face and core layers and an edgewise shear strength of 1,940 psi; predictably, its modulus of elasticity fell to 842,000 psi.

The product of our invention has alined face flakes and its modulus of elasticity brackets that of the alined Douglas-fir board. In addition, however, the edgewise shear strength of our invention is equivalent to that of the Douglas-fir with nonalined core flakes and maximum shear strength. The incorporation of these two outstanding relative properties into the invention was accomplished at compaction ratios much smaller than those of the Douglas-fir boards.

The material type used in this invention is red oak. Although this embodiment specifies the type and amount of binder employed, additives, presstime, temperature, and mat moisture, these variables are all matters of choice for a skilled operator within the ranges utilized for standard particle and fiberboard manufacture.

A bolt of "green" red oak is used for the flake production, for ease in cutting and more dimensionally consistent flakes. The wood is cut to the length appropriate to the flaking or preflaking process.

A log can be used as direct feed to the disk flaker. The flaker is set to a thickness of 0.010 inch and a length of 3 inches; flakes cut to thicknesses and lengths within the normal tolerance of disk flakers at these settings are acceptable. Flake widths may be random. A disk flake is used in the face layer of the particleboard because of its greater length and uniformity as compared to a ring flake. A long flake in the face layer will increase the bending stiffness of that layer. Flake lengths for the face layers may range from 1½ to 5 inches; thicknesses may vary from 0.008 to 0.055 inch.

Logs are generally cut down to fingerlings, wood chips about the size of a finger, in a chipper before being fed to a ring flaker. Flakes with grain running parallel to their lengths can be assured by feeding a log to the chipper with its lengthwise axis parallel to the lengthwise axis of the shaft of the chipper. The ring flaker is set to a thickness of 0.045 inch and should in this embodiment allow flakes of lengths no more than about two inches; flakes cut to thicknesses and lengths within the normal tolerances of ring flakers at these settings are acceptable. Flake widths may be random. Ring flakes are used in the core layer because the precision of a disk flake is not required for the core and thus the higher expense of disk flaking cannot be justified. Core flake lengths may vary from 1 to 3 inches; flake thickness may range from 0.035 to 0.075 inch.

It is desirable that fines be removed from the flakes before further processing. Fines use an amount of adhesive disproportionate to their weight because of their high surface area per unit weight. Fines also add little to the strength of the board because of their negligible fiber length. Material passing through a 16 mesh screen is considered fines.

The flakes for the core and face layer mats before hot pressing should be at 10 percent moisture content by weight. As the flakes from the flakers will generally be of a moisture content greatly exceeding 10 percent and as more water will be added before matting upon the mixing of wet adhesive and flakes described in this embodiment, water must be removed at some point prior to matting. This is done in this embodiment by drying the wet flakes from the flakers to a moisture content of about 4 percent.

The adhesive used is 43.5 percent solids, liquid phenolic resin. Each 104 pounds of flakes (4 pct moisture content basis) for the core layer is mixed with 6 pounds of adhesive solids and 1 pound of wax solids. Each 104 pounds of flakes (4 pct moisture content basis) for the face layer is mixed with 5 pounds of adhesive and 1 pound of wax. The flakes, adhesive, and wax, which is added to enhance the end product's moisture resistance, can be mixed in a blender. The amount of adhesive to be used in the board may vary from 4.0 to 10.0% of the ovendry weight of the flakes.

The prepared flakes are placed in a forming machine for laying onto a caul. A nonperforated caul is anticipated by this embodiment, as insufficient moisture will be removed to justify the use of a perforated caul. A deckle box is used to assure uniform mat thickness and well defined mat edges. An alined face layer is laid first, followed by the core layer, followed by another alined face layer. A 2- by 8-foot 1⅛-inch panel with a density of approximately 46.2 pounds per cubic foot (5 pct moisture basis) can be manufactured by using approximately 12.9 pounds of wet flakes in each of the face layers and 47.2 pounds of wet flakes in the core layer. By "wet flakes" we mean flakes dried to 4 percent moisture by weight and then mixed with the adhesive and wax in proportions suggested in the previous paragraph.

It is essential that each of the face layers is alined such that the flake alinement is approximately 40 percent. (See Geimer, R. L., *Flake Alinement in Particleboard as Affected by Machine Variables and Particle Geometry.* Madison, Wis., Forest Products Laboratory, USDA Forest Service, 1976.1.9.F761Rp. FPL 275.) The flakes should be alined such that a line running along the flake's length is, as closely as possible, parallel to a line running along the length of the particleboard.

This is accomplished in this embodiment with a laboratory-size reciprocating plate flake alinement machine. Similar results can be attained through the use of one of the many commercial alinement machines.

After the mat is formed, it is moved to a hydraulic press with oil- or steam-heated platens heated to a temperature of 350° F. The press is set for a closure of from one to one and one-half minutes, with a total press time of 18 minutes. Closure is the time from contact of both platens to both face layers of the mat until compression of the mat to its final thickness. Total press time is the time from initiation of compression of the mat to release of the hydraulic press, and is dependent upon the time needed for curing the adhesive in the board.

The completed board will have a total thickness of 1⅛ inches, each of the face layers 1 being approximately 3/16-inch thick, and the core layer 3 being approximately ¾-inch thick.

Literature

1. Stewart, H. A., and W. F. Lehmann.
   High quality particleboard from cross-grain, knife-planed hardwood flakes. For. Prod. J. 23(8):52-60. August 1973. 99.9.F7662J.
2. Heebink, B. G., and R. A. Hann.
   Stability and strength of oak particleboards. For. Prod. J. 9(7):197-203. July 1959. 99.9.F7662J.
3. Post, P. W.
   Effect of particle geometry and resin content on bending strength of oak flakeboard. For. Prod. J. 8(10):317-322. October 1958. 99.9.F7662J.
4. Hse, C. -Y.
   Properties of flakeboards from hardwoods growing on southern pine sites. For. Prod. J. 26(7):21-27. July 1975. 99.9.F7662J.
5. Geimer, R. L., W. F. Lehmann, and J. D. McNatt.
   Engineering properties of structural particleboards from forest residues. USDA Forest Service, Forest Products Laboratory, Madison, Wis., 1975. COM 2.G274E.
6. Hunt, M. O., W. L. Hoover, D. A. Fergus, W. F. Lehmann, and J. D. McNatt.
   Red oak structural particleboard for industrial/commercial roof decking. (Unpublished). Department of Forestry and Natural Resources, Purdue University, West Lafayette, Ind.

TABLE 1

| Furnish wood | Specific gravity[1] Furnish | Specific gravity[1] Particleboard | Test direction | Compaction ratio Specific gravity of particle board ÷ Specific gravity of furnish | Homogeneous (H) Layered (L) | Alined (A) Cross Alined (CA) Non Alined (N) | Bending modulus of elasticity ($\times 10^3$ psi) | Edgewise shear strength (psi) | Source |
|---|---|---|---|---|---|---|---|---|---|
| Red oak | 0.62 | 0.66 | | 1.06 | H | N | 447 | | 1 |
| | | 0.60 | | 0.97 | H | N | 371 | | 1 |
| | | 0.52 | | 0.84 | H | N | 270 | | 1 |
| | | 0.61 | | 0.98 | H | N | 453 | | 1 |
| | | 0.60 | | 0.97 | H | N | 302 | | 1 |
| | | 0.58 | | 0.94 | H | N | 222 | | 1 |
| | 0.56 | 0.72 | | 1.29 | H | N | 353-744 | | 2 |

TABLE 1-continued

| Furnish wood | Specific gravity[1] Furnish | Specific gravity[1] Particle-board | Test direction | Compaction ratio Specific gravity of particle board ÷ Specific gravity of furnish | Homo- geneous (H) Layered (L) | Alined (A) Cross Alined (CA) Non Alined (N) | Bending modulus of elasticity ($\times 10^3$ psi) | Edgewise shear strength (psi) | Source |
|---|---|---|---|---|---|---|---|---|---|
| Scarlet Oak | 0.65 | 0.672 | | 1.03 | H | N | 382–653 | | 3 |
| Hickory | 0.702 | 0.708 | | 1.01 | H | N | 707 | | 4 |
| | | 0.810 | | 1.15 | H | N | 853 | | 4 |
| Douglas-fir | 0.48 | 0.65 | Parallel | 1.35 | L | Faces-A Core-CA | 1,398 | 1,280 | 5 |
| | | 0.63 | Perpendicular | 1.31 | L | Faces-A Core-CA | 412 | 1,620 | 5 |
| | | 0.67 | | 1.40 | L | Faces-N Core-N | 842 | 1,940 | 5 |
| Red oak (Invention) | 0.763 | 0.782 | Parallel | 1.02 | L | Faces-A Core-N | 1,402 | 2,285 | 6 |
| | | 0.782 | Perpendicular | 1.02 | L | Faces-A Core-N | 439 | 2,205 | 6 |
| | | 0.740 | Parallel | 0.97 | L | Faces-A Core N | 1,304 | 1,797 | 6 |
| | | 0.740 | Perpendicular | 0.97 | L | Faces-A Core-N | 419 | 1,915 | 6 |
| | | 0.681 | Parallel | 0.89 | L | Faces-A Core-N | 1,062 | | 6 |
| Target | 0.636 | 0.636 | | 1.000 | L | Faces-A Core-N | 1,180 | | 6 |

[1]Weight and volume at 80° F. and 50 percent R.H. for the invention. Specific gravities for the other boards were based on different temperatures and relative humidities. However, the compaction ratio is the significant variable for comparison among board types.

Having thus described our invention, we claim:

1. In a structural board comprising at least three laminae bonded together with resin, each lamina consisting of wood flakes bonded together with said resin, the fibers of the flakes extending generally parallel to the surface of the board and to the length of the flakes, substantially all of the flakes in both outer laminae crossing at least one other flake in the same lamina at an acute angle, the average direction of the bisectors of said acute angles being substantially parallel to one edge of the board, the average face lamina flake length being 1½ to 5 inches, the average core lamina flake length being 1 to 3 inches, the resin content in the panel being 4.0 to 10.0% the weight of the oven dry flakes in the panel, the improvement wherein (a) the wood flakes are hardwood with a specific gravity greater than 0.6;

(b) the face layer flakes have an average thickness in a range of 0.008 to 0.055 inch and the core layer flakes have an average thickness in a range of 0.005 to 0.075 inch;

(c) said structural board has a bending stiffness greater than 800,000 psi;

(d) said structural board has an edgewise shear of greater than 1,800 psi;

(e) said structural board has a specific gravity less than the specific gravity of its constituent wood species; and (f) said structural board has flake alinement averaging 40 percent in said outer laminae.

2. The strucural board as defined by claim 1, wherein said structural board has a bending stiffness greater than 1,180,000 psi.

3. The structural board as defined by claim 1, wherein the resin comprises 6% of the ovendry weight of the flakes in the core layer and 5% of the ovendry weight of the flakes in the face layer.

4. A structural board as defined by claim 1, wherein the face layer flakes average 3 inches in length and 0.010 inches in thickness.

5. A structural board as defined by claim 1, wherein the core layer flakes average 2 inches in length and 0.045 inch in thickness.

* * * * *